United States Patent [19]
Maeda et al.

[11] Patent Number: 5,420,700
[45] Date of Patent: May 30, 1995

[54] IMAGE CONVERSION APPARATUS HAVING SCANNING MECHANISM AND OPTICAL SYSTEM ON SINGLE BASE

[75] Inventors: Eisaku Maeda, Sakura; Toshiya Aikawa; Masashi Tazawa, both of Kawasaki; Hideaki Kishino, Tokyo, all of Japan

[73] Assignee: Nikon Corporation, Tokyo, Japan

[21] Appl. No.: 309,470

[22] Filed: Sep. 22, 1994

Related U.S. Application Data

[63] Continuation of Ser. No. 743,236, Aug. 9, 1991, abandoned.

[30] Foreign Application Priority Data

Aug. 23, 1990 [JP] Japan ................... 2-222210
Aug. 29, 1990 [JP] Japan ................... 2-227083

[51] Int. Cl.[6] .............................................. H04N 1/00
[52] U.S. Cl. ..................... 358/496; 358/487; 358/506
[58] Field of Search ............... 358/296, 302, 443, 487, 358/496, 498, 506, 527; 359/507, 508; 352/106, 109

[56] References Cited

U.S. PATENT DOCUMENTS

| | | | |
|---|---|---|---|
| 4,310,848 | 1/1982 | Carter et al. | 358/76 |
| 4,792,858 | 12/1988 | Landsman | 358/497 |
| 4,937,615 | 6/1990 | Tokuda | 355/35 |
| 4,953,038 | 8/1990 | Schiebel et al. | 358/496 |
| 4,994,850 | 2/1991 | Imamura | 355/35 |
| 5,055,941 | 10/1991 | Suzuki et al. | 358/76 |
| 5,113,268 | 5/1992 | Yoshida et al. | 358/487 |

*Primary Examiner*—Edward Coles, Sr.
*Assistant Examiner*—Kimberly A. Williams
*Attorney, Agent, or Firm*—Shapiro and Shapiro

[57] ABSTRACT

An image conversion apparatus for converting an image recorded on an original into an electrical signal upon reception of illumination light transmitted through the original, includes a moving device for mechanically moving the original while holding the original, an optical device for focusing the illumination light transmitted through the original on a focal plane as an image, and an image sensor device for converting the image focused on the focal plane into an electrical signal. The moving device and the optical device share a single base, and a shielding device for preventing a lubricant from being scattered from the moving device to the optical device is formed between the moving device and the optical device.

4 Claims, 7 Drawing Sheets

IMAGE CONVERSION APPARATUS HAVING SCANNING MECHANISM AND OPTICAL SYSTEM ON SINGLE BASE

This is a continuation of application Ser. No. 07/743,236 filed Aug. 9, 1991, now abandoned.

BACKGROUND OF THE INVENTION

1. Field of the Invention

The present invention relates to a film image conversion apparatus for reading an image on a film using a linear image sensor, and converting the image into an electrical signal, and a photo-telegraphy apparatus for transmitting the electrical signal.

2. Related Background Art

FIG. 2 shows a conventional film image conversion apparatus.

In FIG. 2, a projection optical system 3 and a linear image sensor 4 are mounted on an optical base 12 to constitute a projection optical system block.

A scanning stage 2, a film holder 5, a stepping motor 8, a joint 9, a lead screw 11, and stage guide bars 10 are mounted on a scanning mechanism base 13 to constitute a scanning mechanism block.

Since the scanning mechanism system block and the projection optical system block respectively have independent base units, i.e., the optical base 12 and the scanning mechanism base 13, they are fastened by a fixing screw 14.

When an image on a film is converted into an electrical signal, a light beam emitted from a light source 7 is transmitted through a film original 6 held on the film holder 5 arranged on the scanning stage 2. The transmission light beam is focused on the linear image sensor 4 by the projection optical system 3. The linear image sensor 4 converts the focused light beam into an electrical signal according to an image of the film original 6 (main scanning).

At the same time, the lead screw 11 is driven through the joint 9 by the stepping motor 8 controlled by a control system (not shown), and the scanning stage 2 is moved in the subscanning direction.

As a result, the entire image of the film original 6 is converted into an electrical signal by the linear image sensor 4.

The stage 2 is driven by the lead screw 11, and is moved along the two stage guide bars (linear guide mechanism) 10. Thus, movement of the stage 2 in directions other than the longitudinal direction caused by poor working precision of the lead screw 11 is suppressed.

The conventional film image conversion apparatus described above suffers from the following problems.

(1) Since the step of assembling the base units of the scanning mechanism system block and the projection optical system block by the fixing screw is required, the number of assembling steps of the film image conversion apparatus is undesirably increased.

(2) When the block units of the two blocks are fixed, the assembling precision must be improved, and the precision of each of components constituting the two blocks must be improved.

(3) In order to provide a sufficient mechanical strength to the coupling portion between the base units of the two blocks, the thicknesses of the base units corresponding to the coupling portion must be increased. For this reason, the base units become bulky, and the weight of the film image conversion apparatus itself is undesirably increased.

(4) Since no component is interposed between the scanning mechanism system block and the projection optical system block, a lubricant applied to a driving portion such as the lead screw mounted on the scanning mechanism base is scattered toward the projection optical system, and contaminates lenses of the projection optical system.

A conventional photo-telegraphy apparatus has an arrangement as shown in FIGS. 12 and 13. FIGS. 12 and 13 are respectively a plan view and a side view showing a structure of the conventional photo-telegraphy apparatus.

In FIGS. 12 and 13, a 35-mm film as an original is mounted on a film holder 107. The apparatus main body has a notched portion 130 as a space for an operation for mounting the film holder 107. A horizontally movable stage 106 is arranged on the vertical surface of the notched portion 130, and the film holder 107 is detachably attached on the stage 106. When the length of the film original is larger than the width of the notched portion 130, the film original 130 must be cut into a proper length or must be wound.

After the film holder 107 is attached to the stage 106, a light-shielding lid 134 for closing the notched portion 130 is closed so as to shield external light.

The film holder 107 has a window corresponding to one frame of the film, and this window portion is subjected to transmission illumination.

An illumination optical system for performing transmission illumination of the film includes a lamp 112, a 45° mirror 113, and a condenser lens 133.

Light emitted from the lamp 112 is reflected by the 45° mirror 113, and is radiated on the film original in the film holder 107 via the condenser lens 133. The light transmitted through the film original passes through a zoom lens 114, and is then guided to a finder 132 via a 45° mirror 131.

A user can see an optical image displayed on the finder 132 when he or she operates the zoom lens 114 to perform a trimming operation.

When the film image is read, the 45° mirror 131 is pivoted upward. In this case, transmission light of the film via the zoom lens 114 is focused on a CCD line sensor 115.

When the stage 106 on which the film holder 107 is attached is horizontally moved, an image is sequentially focused on the CCD line sensor 115 in units of lines, thereby reading the entire image.

The image focused on the CCD line sensor 115 is converted into an electrical image signal. The electrical image signal is subjected to various signal processing operations, and the processed signal is then output outside the apparatus.

The read image is displayed on a display screen 139a of a monitor device 139.

An operation unit 135 is connected to the photo-telegraphy apparatus main body via a cable 136. An operation such as menu selection can be performed by depressing an operation button while observing an LCD (liquid crystal display).

In the above-mentioned photo-telegraphy apparatus, an optical system including the 45° mirror 113, the condenser lens 133, the zoom lens 114, the 45° mirror 131, and the like; a mechanism section consisting of the stage 106, and its driving unit; and electrical circuit units 137 and 138 for processing an image signal, and for controlling the mechanism section, the operation unit 135, and the like are arranged together.

In the conventional structure, the optical system, the mechanism section, and the electrical circuit sections are arranged together. Since the film holder is mounted in the notched portion in the upper portion of the apparatus, the optical system is arranged in the upper portion of the apparatus. For this reason, the electrical circuit unit 137 and a power supply 121 are arranged in a lower portion of the apparatus.

With this arrangement, in particular, the electrical circuit unit 137 and the power supply 121 are arranged in the lower portion of the apparatus, and this results in poor workability in maintenance.

SUMMARY OF THE INVENTION

It is an object of the present invention to provide an image conversion apparatus which can reduce the number of assembling steps.

It is another object of the present invention to provide an image conversion apparatus which can align an original image without improving precision of each component.

It is still another object of the present invention to provide a light-weight image conversion apparatus.

It is still another object of the present invention to provide an image conversion apparatus which can prevent an optical means from being contaminated.

It is still another object of the present invention to provide a photo-telegraphy apparatus which allows easy maintenance.

In order to achieve the above objects, according to the present invention, there is provided a film image conversion apparatus comprising a scanning mechanism block for moving an original while holding it, a projection optical system block for focusing illumination light transmitted through an image on an original onto a focal plane, and a linear image sensor arranged on the focal plane, wherein the scanning mechanism system block and the projection optical system block are arranged on a single base, and the base is formed to partition the scanning mechanism system block and the projection optical system block from each other.

According to the present invention, since the scanning mechanism system block and the projection optical system block are arranged on the single base, no fixing screw for fixing the two blocks is required unlike in the conventional apparatus.

A lens mounting surface of the base, and a linear guide mounting surface of the scanning mechanism can be simultaneously worked.

Since a wall for partitioning the two blocks is formed on the base, it serves as a rib for reinforcing the base, and can prevent a lubricant from being scattered from the scanning mechanism system block toward the projection optical system block.

In order to achieve the above objects, according to the present invention, there is provided a photo-telegraphy apparatus comprising a line sensor for converting a focused image into an electrical image signal, a stage on which a film original is attached, a mechanism section having a mechanism for moving the stage, an illumination unit having a light source for illuminating the film original, an optical system for focusing light transmitted through the film original onto the line sensor, and an electrical circuit unit for processing the image signal from the line sensor, and outputting the processed signal outside the apparatus, wherein the illumination unit is arranged in an upper portion on a front surface side of an apparatus main body, the mechanism unit and the optical system are arranged in a lower portion on the front surface side of the apparatus main body, and the electrical circuit unit is arranged on a rear surface side of the apparatus main body.

With this arrangement, the film original attached to the stage in the mechanism unit arranged in the lower portion on the front surface side of the apparatus main body is illuminated by the illumination unit arranged in the upper portion on the front surface side of the apparatus main body. Transmission light is caused to become incident on the optical system arranged in the lower portion on the front surface side of the apparatus main body, and can be focused on the line sensor. An image signal output from the line sensor is processed by the electrical circuit unit, and can be output outside the apparatus.

DESCRIPTION OF THE PREFERRED EMBODIMENTS

Figure 1:
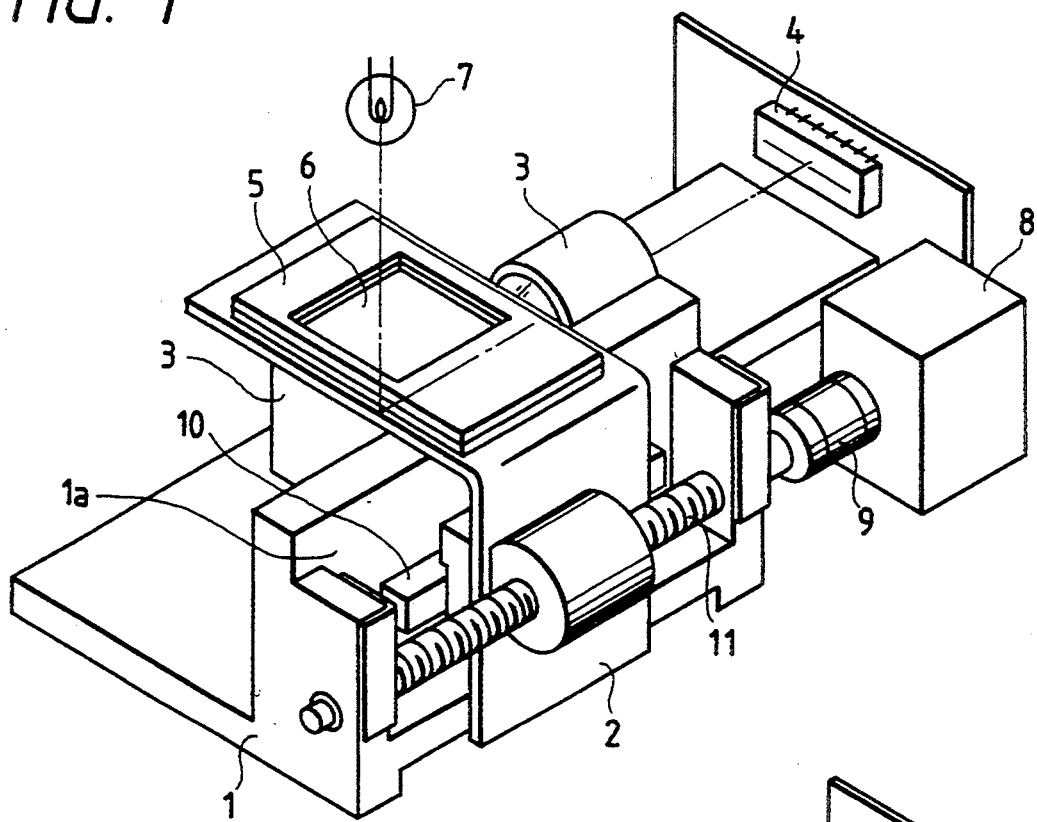
FIG. 1 is a perspective view showing an embodiment of the present invention.
Figure 2:
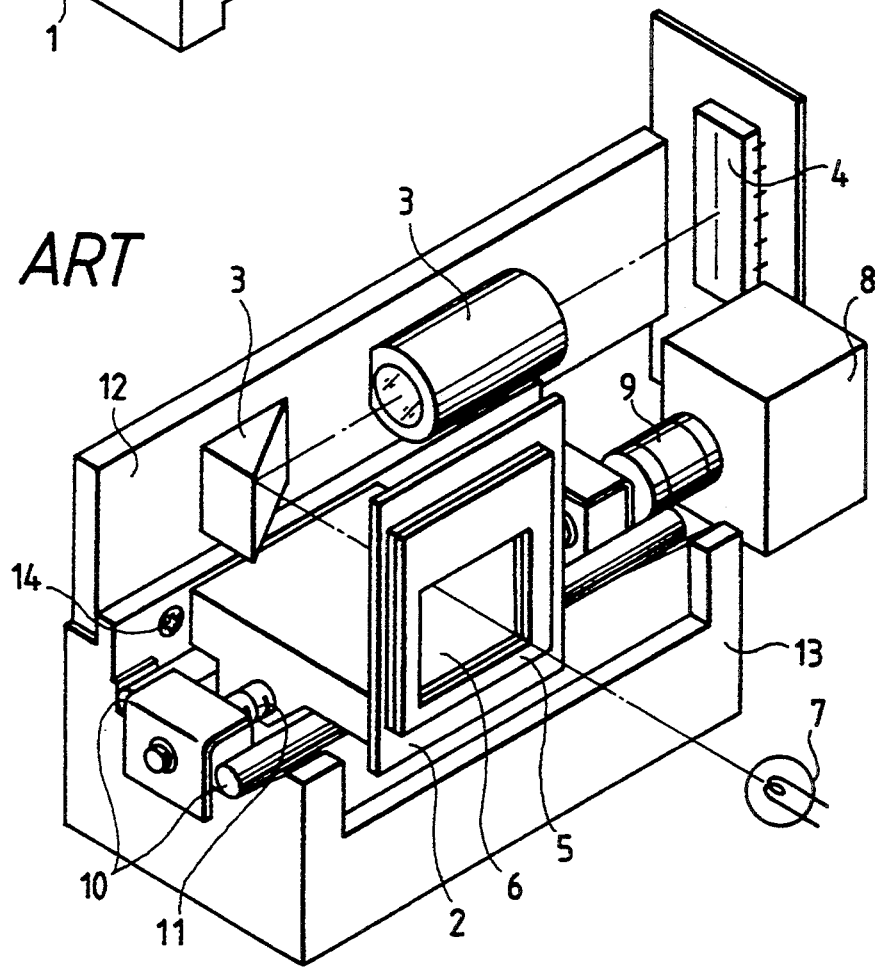
FIG. 2 is a perspective view showing a conventional film image conversion apparatus.

FIG. 1 is a perspective view showing an embodiment of the present invention. A description will be given below with reference to FIG. 1.

In FIG. 1, respective components of a scanning mechanism system consisting of a linear guide mechanism 10 for guiding a scanning stage 2, a stepping motor 8, a joint 9, and a lead screw 11 for moving the scanning stage 2, and those of a projection optical system, including a projection lens 3, for projecting original information onto a linear image sensor 4 are arranged on a base 1.

In FIG. 1, the components of the scanning mechanism system and the projection optical system are arranged on the base 1. A wall 1a for partitioning the components of the scanning mechanism system and the projection optical system is formed on the base 1 between the two systems.

More specifically, the components of the scanning mechanism system are arranged on one side of the wall 1a formed on the base 1, and the components of the projection optical system are arranged on the other side of the wall 1a.

The stepping motor 8 drives the lead screw 11 via the joint 9. When the lead screw 11 is driven, the scanning stage 2 is moved in the longitudinal direction of the lead screw 11. A film holder 5 for holding a film original 6 is arranged on the scanning stage 2.

The linear guide mechanism 10 is a known mechanism for suppressing movement of the scanning stage 2 in directions other than the longitudinal direction upon rotation of the lead screw 11, and for precisely linearly moving the scanning stage 2.

The projection optical system 3 focuses a light beam emitted from a light source 7 and transmitted through the film original 6 onto the linear image sensor 4.

The operation of the film image conversion apparatus with the above arrangement according to the present invention is the same as the conventional apparatus, and a detailed description thereof will be omitted.

As described above, the scanning mechanism system block and the projection optical system block are arranged on a single base, and the base is formed to partition the scanning mechanism system block and the projection optical system block from each other. Therefore, the following effects can be expected.

(1) Since no fixing screw for fixing base units of the two blocks is required unlike in the conventional apparatus, the number of parts of the apparatus is decreased, and hence, the number of assembling steps is also decreased.

(2) Since a lens mounting surface of the base, and a linear guide mounting surface can be simultaneously worked, feed precision of a film original can be improved.

(3) Since the wall formed on the base serves as a rib for increasing the mechanical strength of the base, no reinforcing means is required, and the thickness of the base can be decreased as compared with the conventional apparatus. As a result, the weight of the entire apparatus can be reduced.

(4) Since the wall can prevent a lubricant from being scattered from the scanning mechanism system toward the projection optical system, the lens of the projection optical system can be prevented from being contaminated.

Another embodiment of the present invention will be described below.

Figure 3:
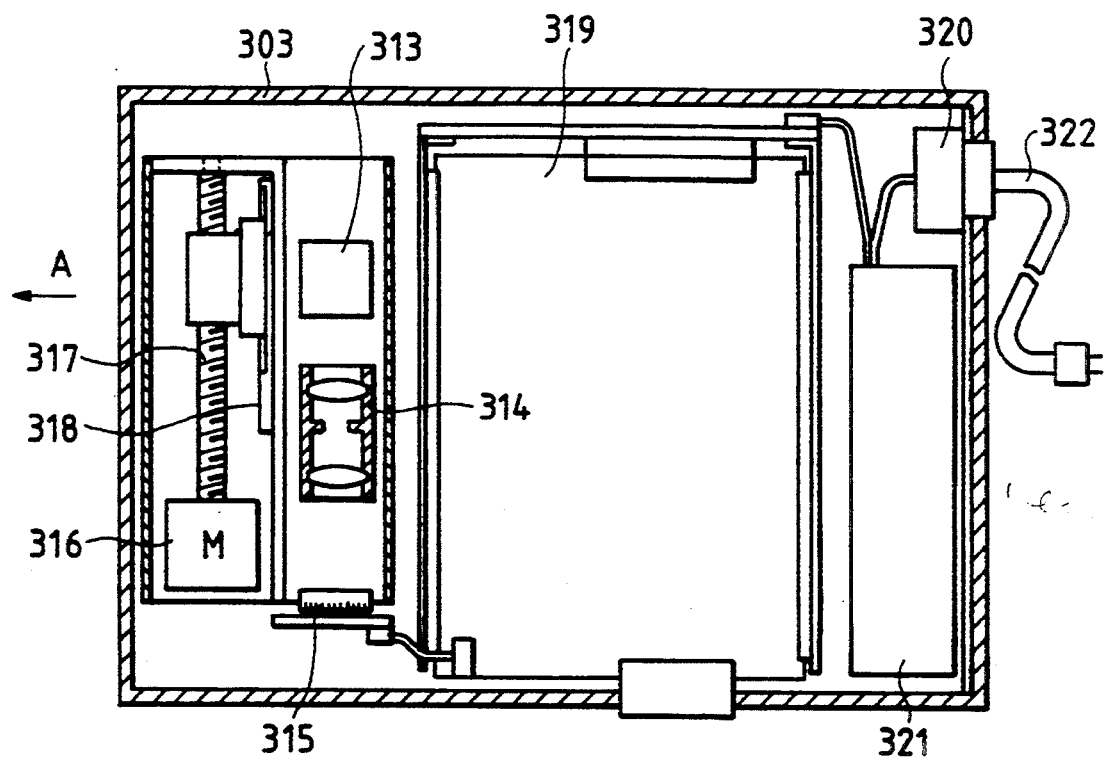
FIG. 3 is a schematic sectional plan view of a photo-telegraphy apparatus according to another embodiment of the present invention.
Figure 4:
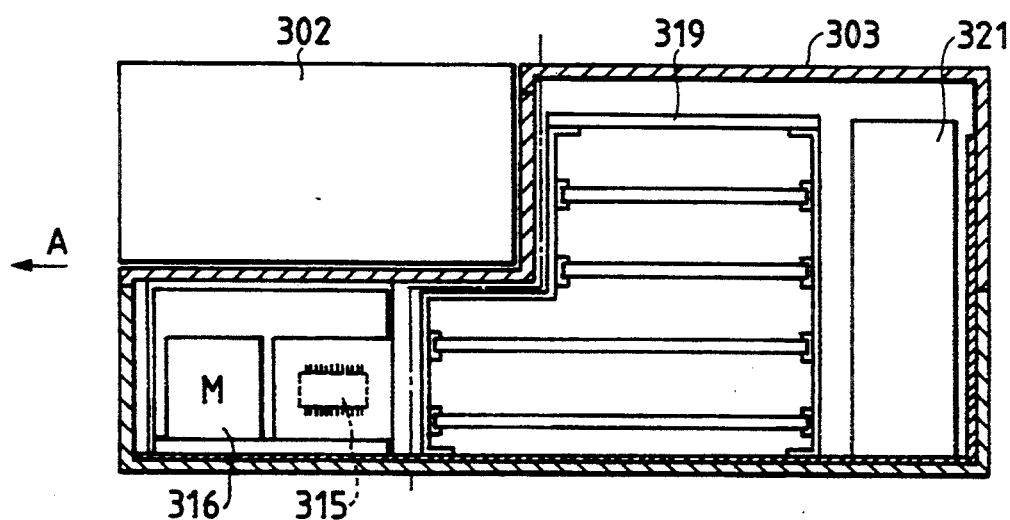
FIG. 4 is a schematic side sectional view of the photo-telegraphy apparatus.

FIGS. 3 and 4 are respectively a plan view and a side view showing an internal structure of a photo-telegraphy apparatus according to another embodiment of the present invention.

In FIGS. 3 and 4, a user operates the apparatus on a side indicated by an arrow A. In the following description, a surface on the side indicated by the arrow A will be referred to as a front surface hereinafter, and a surface opposite to the surface on the side indicated by the arrow A will be referred to as a rear surface hereinafter.

fin FIGS. 3 and 4, an optical system consisting of a 45° mirror 313 for changing a direction of transmission light from a film, a CCD line sensor 315, and a projection lens 314 for focusing light reflected by the 45° mirror 313 onto the CCD line sensor 315 is arranged on the front surface side in an apparatus main body 303.

A stage for placing a film original is arranged above the 45° mirror 313 in FIG. 3, and a mechanism section consisting of a driving unit 318 for moving the stage to perform a scanning operation, a motor 316 for operating the driving unit 318, and a lead screw unit 317 for transmitting rotation of the motor 316 to the driving unit 318 is also arranged on the front surface side in the apparatus main body 303.

An electrical circuit unit 319 is arranged on the rear surface side in the apparatus main body 303. The electrical circuit unit includes a control circuit for controlling light emission of the illumination unit, and for controlling the motor to move the stage, an image signal processing circuit for, e.g., amplifying and correcting an image signal output from the CCD line sensor, a telegraphy output circuit for outputting an image signal outside the apparatus to transfer it using a telephone line, and an interface circuit for outputting signals to an external monitor, and an external printer, and for receiving signals from a caption input device.

These circuits are inserted to be detachable in the horizontal direction.

A power supply 321 for operating these circuits is arranged on the rear surface side in the apparatus main body 303 when viewed from a user. A power supply input unit 320 is arranged on the rear surface side when viewed from the user, and is connected to a power supply cord 322.

Figure 5:
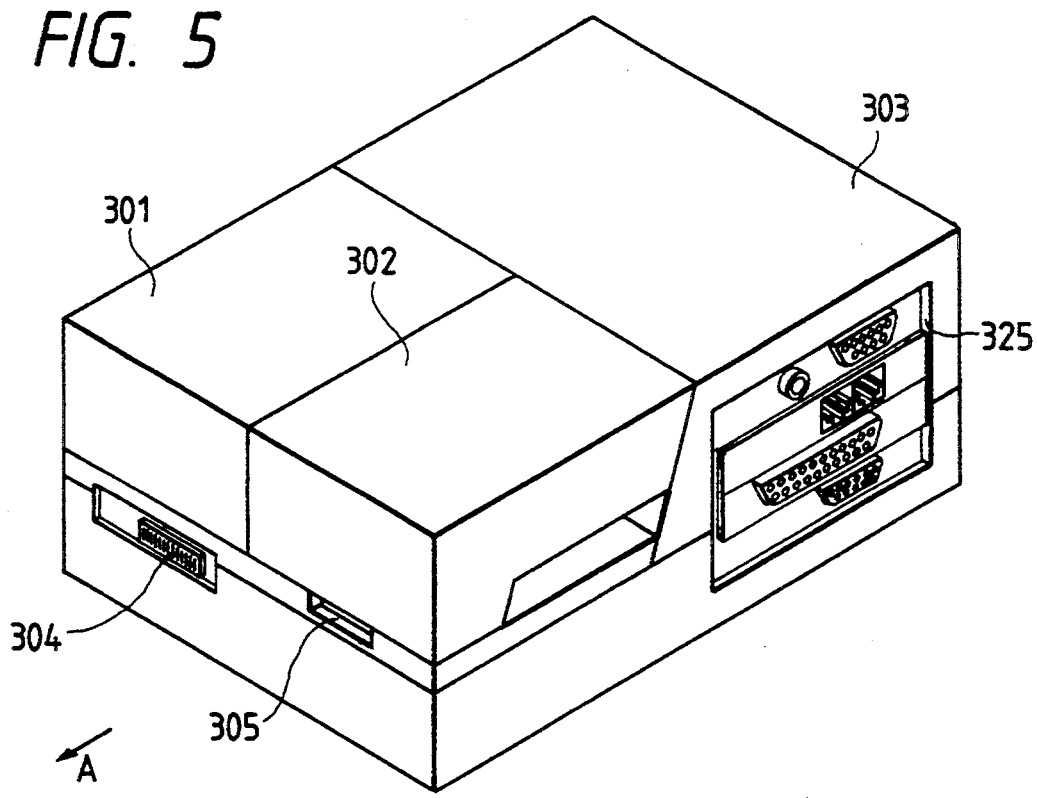
FIG. 5 is a perspective view showing the outer appearance of the photo-telegraphy apparatus.

FIG. 5 is a perspective view showing the outer appearance of the photo-telegraphy apparatus according to the embodiment of the present invention. A user operates this apparatus on the side indicated by the arrow A in FIG. 5.

An illumination unit 301 and a display unit 302 are arranged on the front surface side.

Figure 6:
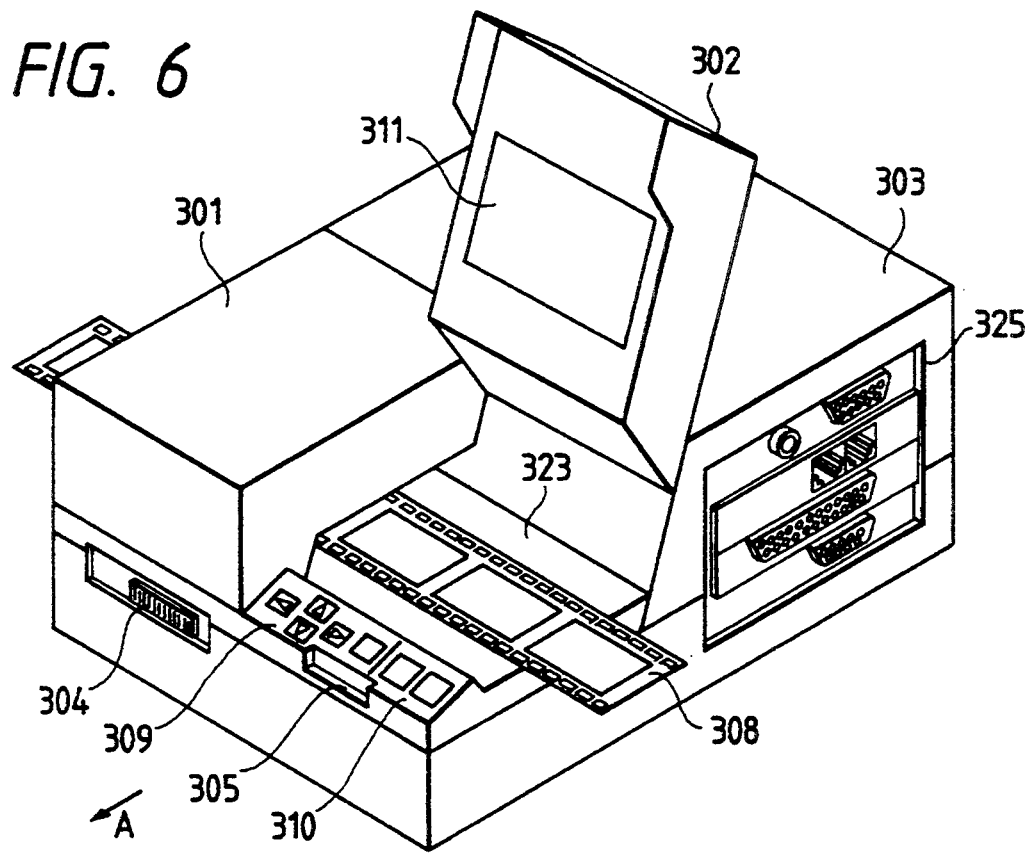
FIG. 6 is a perspective view showing the outer appearance of the photo-telegraphy apparatus when a display unit is set upright.

The display unit 302 can be lifted upward by inserting a finger in a recess 305, and can be set upright. FIG. 6 shows a state wherein the display unit 302 is set upright.

When the display unit 302 is set upright, as shown in FIG. 6, a user can see an LCD (liquid crystal display) 311 arranged on the lower surface of the display unit 302 from the front surface side.

When the display unit 302 is raised, since a connecting portion between the display unit 302 and the apparatus main body 303 has a known free-stop mechanism, a raising angle can be arbitrarily set.

Operation button units 309 and 310 are arranged in front of a horizontal surface 323 which appears when the display unit 302 is set upright. A user can perform various operations such as menu selection by depressing operation buttons on the operation button units 309 and 310 while observing the LCD 311. A read film image is displayed on the LCD 311.

In this manner, a display for an operation such as menu selection, and a display of a read image are performed on the LCD 311 as a single monitor device, and the operation button units 309 and 310 are arranged below and in front of the LCD 311. Therefore, movement of an eye line is small, thus improving operability.

Figure 7:
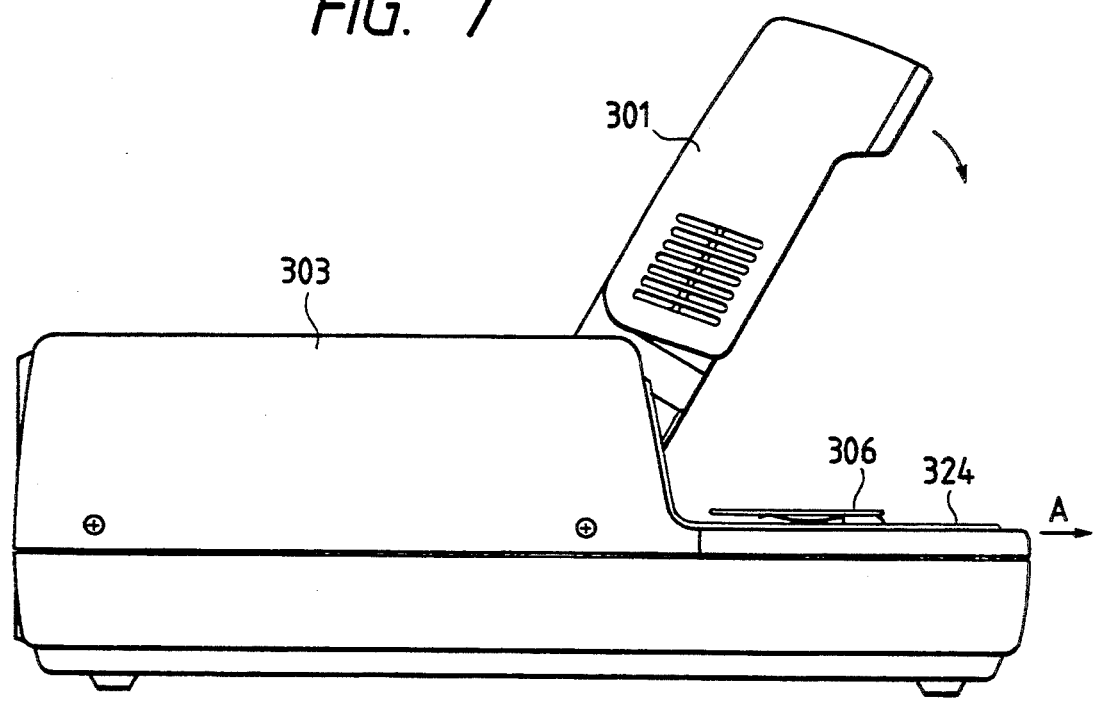
FIG. 7 is a side view showing a state wherein an illumination unit of the photo-telegraphy apparatus is popped up.

The illumination unit 301 is popped up upon operation of a lever 304. FIG. 7 shows the popped-up state. FIG. 7 is a side view of the photo-telegraphy apparatus in a state wherein the illumination unit 301 is popped up.

When the illumination unit 301 is popped up, it is stopped at an angle shown in FIG. 7. This structure can be realized by a known technique. In FIG. 7, the display unit 302 is not shown.

A stage for mounting a film holder is present on a horizontal surface 324 which appears when the illumination unit 301 is popped up.

The horizontal surface 324 and the horizontal surface 323 which appears when the display unit 302 is set upright are in the same plane.

The horizontal surfaces 324 and 323 need not always be precisely horizontal, and need not always define precise planes.

The structure shown in FIGS. 3 to 7 will be summarized below. The illumination unit 301 for illuminating the film, and the display unit 302 for performing a display for an operation, and a display of an image are arranged on the front surface side, and the electrical circuit unit 319 is arranged on the rear surface side.

As for the positional relationship between the illumination unit 301, and the optical system and the mechanism section, the illumination unit 301 is arranged in the upper portion, and the optical system and the mechanism section are arranged in the lower portion.

Figure 8:
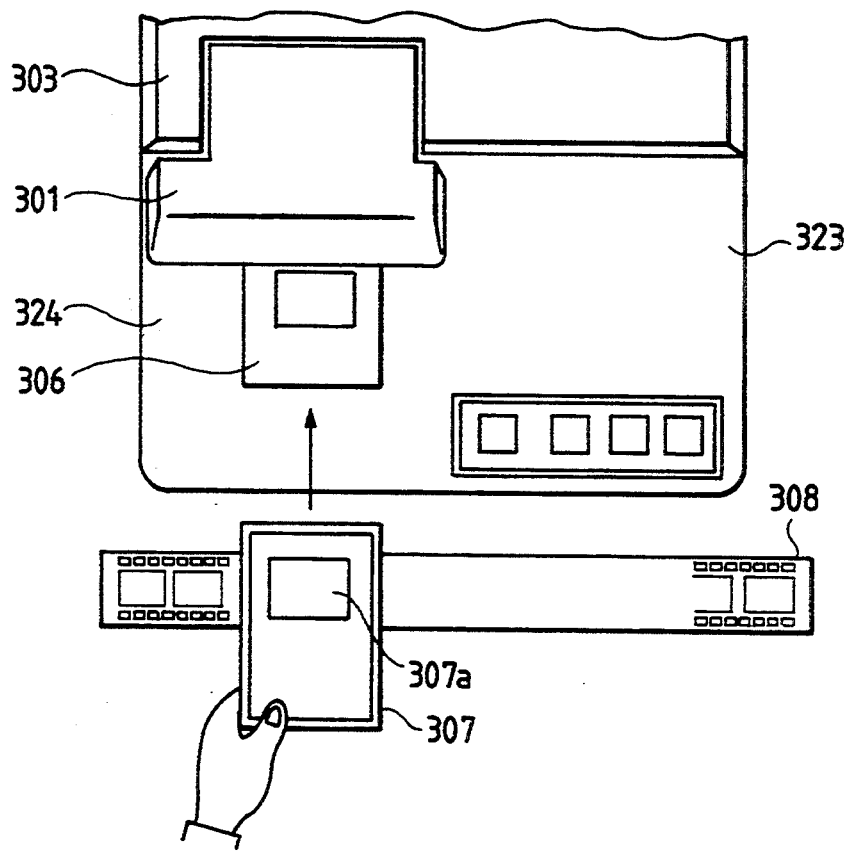
FIGS. 8 to 10 are explanatory views of film holder attachment operations in the photo-telegraphy apparatus.
Figure 9:
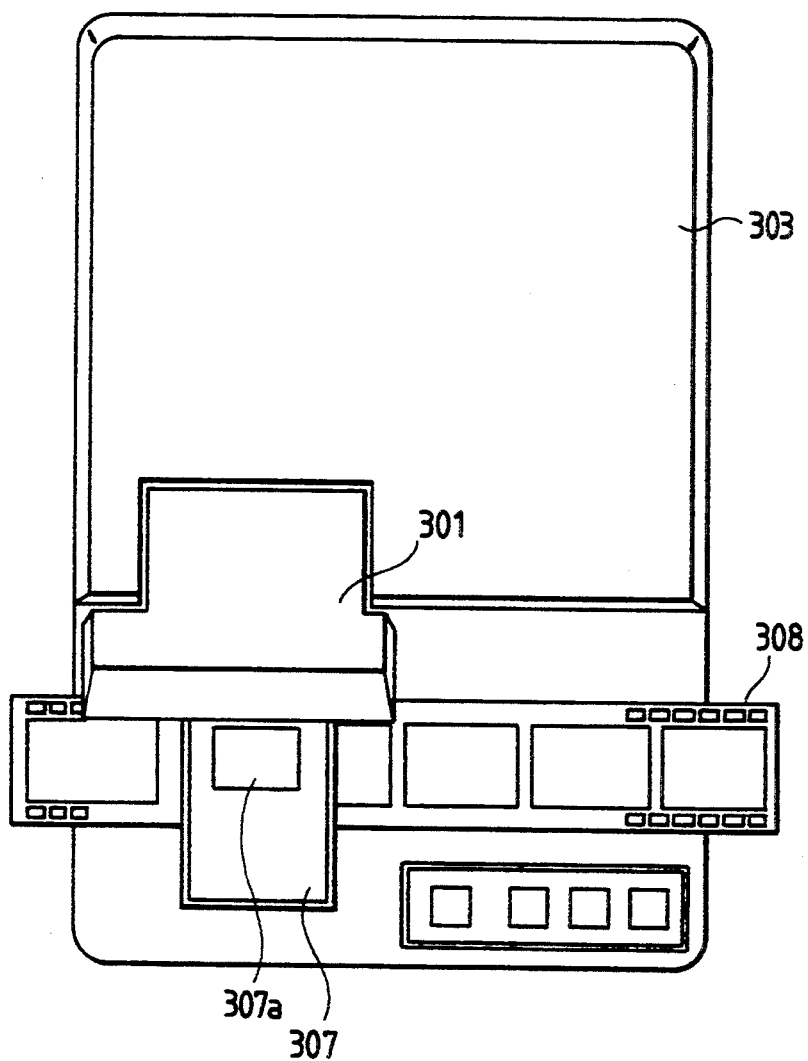
Figure 10:
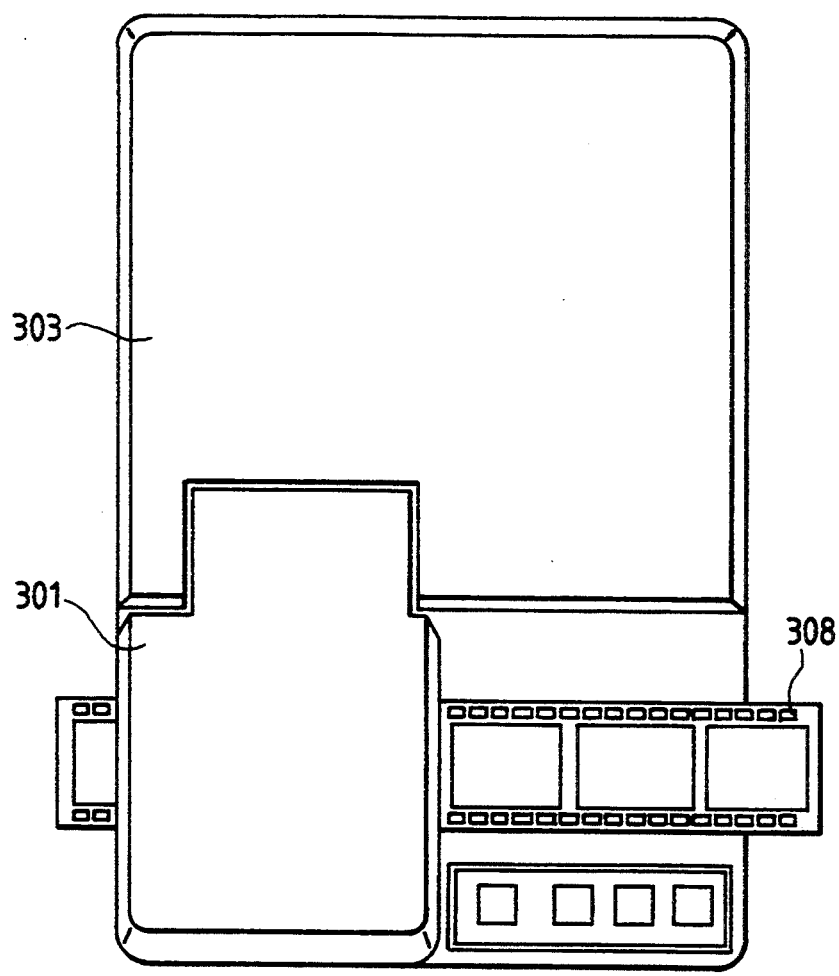

FIGS. 8 to 10 show states wherein the film holder is mounted on the stage. In FIGS. 8 to 10, the display unit 302 is not shown.

As shown in FIG. 8, a film holder 307 clamps a film original 308, so that one frame of the film is exposed from a window 307a. As shown in FIG. 9, the film holder 307 which clamps the film original 308 is mounted on a stage 306 on the horizontal surface 324 of the apparatus main body 303. As shown in FIG. 10, the illumination unit 301 is then pivoted downward to be closed.

In this manner, when the film holder 307 is mounted on the apparatus main body 303, since the stage 306 is present on the horizontal surface 324 on the front surface side of the apparatus main body, an easy mounting operation is allowed.

Since the stage 306 for mounting the film holder 307 is arranged adjacent to an operation/display member on the front surface side of the apparatus main body 303, operability can be further improved.

The film holder 307 can change an inclination of the film original 308 with respect to the stage 306. Thus, an image on a film, which image is inclined upon photographing, can be corrected.

When the illumination unit 301 is closed, the film holder 307 is clamped between the horizontal surface 324 and the illumination unit 301, and a portion, exposed from the window 307a, of the film original 308 clamped by the film holder 307 can be shielded from external light.

As shown in FIG. 10, when the film original 308 is long, it extends to the right and left sides of the illumination unit 301. However, this does not disturb an operation or a function of the apparatus. The right extending portion of the film original 308 is present on the horizontal surface 323. In this case, the operation button units 309 and 310 are arranged at positions so as not to be concealed by the film original.

Figure 11:
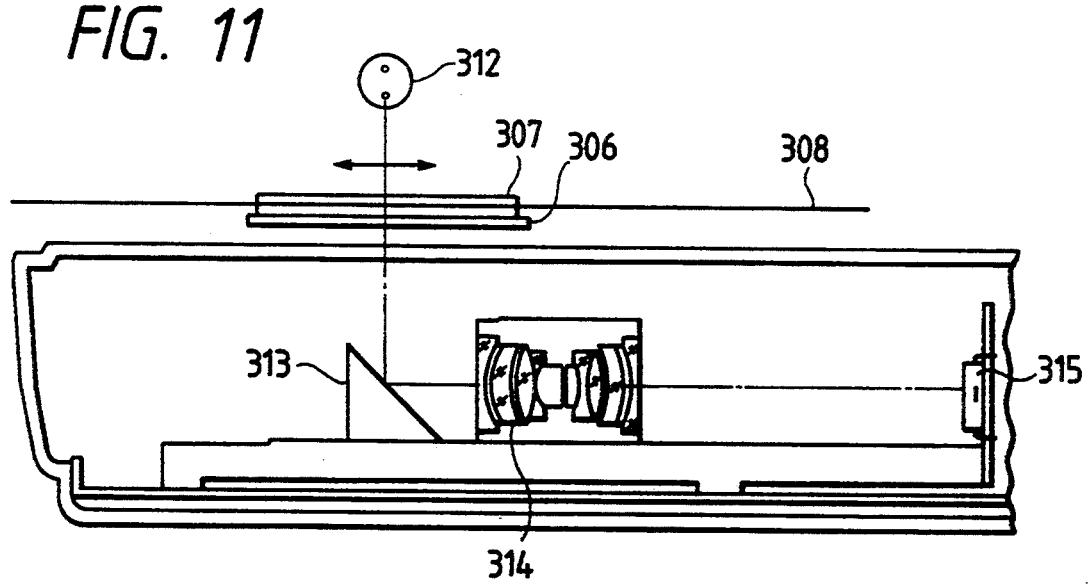
FIG. 11 is a schematic sectional view of an optical system portion of the photo-telegraphy apparatus.
Figure 12:
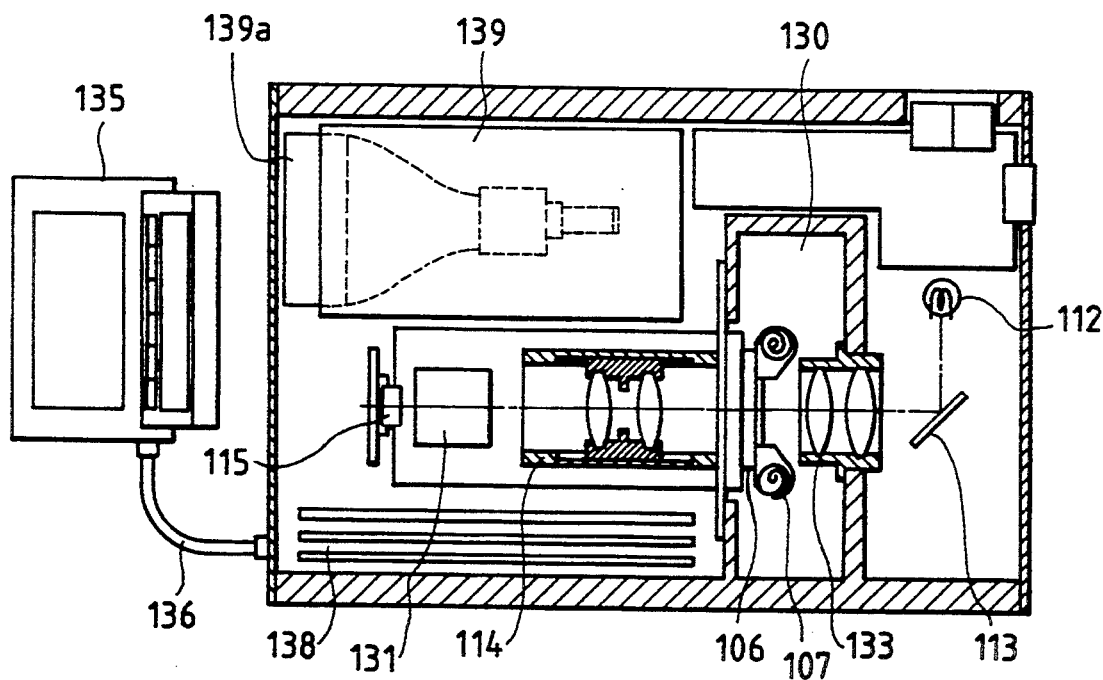
FIG. 12 is a schematic sectional plan view of a conventional photo-telegraphy apparatus.
Figure 13:
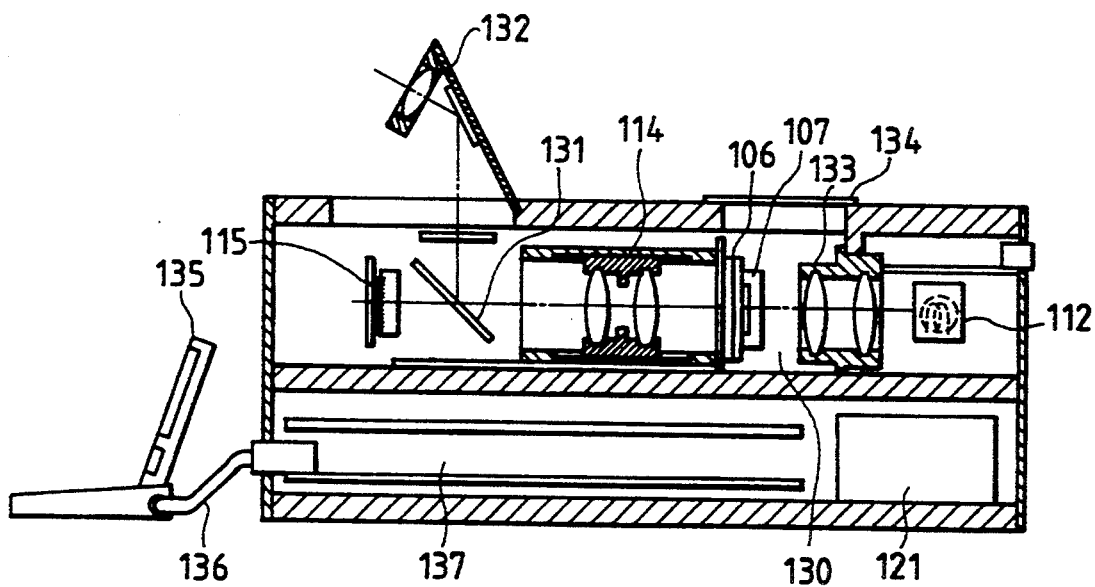
FIG. 13 is a schematic side sectional view of the photo-telegraphy apparatus.

FIG. 11 shows a structure for focusing an image on the film original 308 on the CCD line sensor 315 by transmission illumination, and is a schematic sectional view obtained when a portion of the stage 306 of the apparatus of this embodiment is viewed from the front side.

In FIG. 11, a lamp unit 312 is a linear light source having a cylindrical shape, and arranged in the illumination unit 301 (FIG. 5). A slit (not shown) for allowing light emitted from the lamp unit 312 to pass therethrough is formed in the lower surface of the illumination unit 301. Light passing through the slit is radiated on the film original 308 exposed from the window 307a of the film holder 307 mounted on the stage 306. The light beam transmitted through the film original 308 is incident into the apparatus main body 303, is reflected by the 45° mirror 313, and is then focused on the CCD line sensor 315 via the projection optical system 314.

In this structure, the stage 306 is moved to the right and left to scan the surface of the film original 308, so that an image is focused on the CCD line sensor in units of lines, thereby reading the entire image.

As for the movement of the stage 306, for example, the stage 306 is moved to a position where the left edge of the film original 308 is located below the slit of the illumination unit 301 (i.e., the stage 306 is moved to the right) at the beginning of an image read operation. After the image read operation is started, the stage 306 is moved to the left, and is stopped when the right edge of the film original 308 passes the slit.

The scanning operation includes a preliminary scanning operation and a main scanning operation. In the preliminary scanning operation, an image is input by a coarse scanning operation so as to set correction data associated with the colors or density of a film to be subjected to image input, or to designate a trimming portion, and is displayed on the LCD. Since image information obtained by this scanning operation can be coarse information, the stage can be moved at a higher speed than in the main scanning operation.

In the main scanning operation, an image signal to be transmitted to an external device is obtained. The main scanning operation is performed on the basis of a correction condition or trimming designation, which is set after the preliminary scanning operation.

Since an image on the film original 308 in the film holder 307 mounted on the stage 306 can be confirmed by displaying it on the LCD upon the preliminary scanning, no optical finder is arranged in the apparatus of this embodiment. Therefore, the number of components and a space for the optical system can be eliminated, and a decrease in cost and a compact structure can be realized.

An image focused on the CCD line sensor 315 is converted into an electrical image signal. The electrical image signal is subjected to various signal processing operations, and the processed signal is output from an output terminal on a panel 325 shown in FIG. 5.

Operations of the photo-telegraphy apparatus with the above-mentioned structure will be described below.

When a power switch is turned on, the lamp unit 312 emits light.

The illumination unit 301 is popped up, the film holder 307 is mounted on the stage 306, and the illumination unit 301 is then closed. A telegraphy condition and a film condition are set while observing the LCD 311. These setting operations can be performed by selecting a menu displayed on the LCD 311 upon depression of operation buttons of the operation button unit 309.

Then, the preliminary scanning operation is performed. The preliminary scanning operation can be started by depressing an operation button of the operation button unit 309. When the preliminary scanning operation is started, the stage 306 is moved, and an image on the film original 308 is read from the CCD line sensor 315.

The read image is displayed on the LCD 311. An operation, e.g., color correction can be performed while observing an image displayed on the LCD 311. The operation is performed by depressing an operation button of the operation button unit 309. In this case, the image read by the preliminary scanning operation is displayed on the LCD 311, and characters representing a menu, e.g., a color correction mode, are overwritten on the displayed image.

In this case, trimming designation can also be performed. In the trimming designation, an area to be trimmed is designated on the image read by the preliminary scanning operation and displayed on the LCD 311 upon depression of an operation button of the operation button unit 309. The trimming designation can also be performed by a mouse if the mouse is connected to the apparatus.

After the above operations, an operation button of the operation button unit 309 is depressed to select a menu of telegraphy start. The stage 306 is then moved to start the main scanning operation, and the image on the film original 308 is read from the CCD line sensor 315. In this case, if the trimming designation is made, only an image within a designated range is read.

The operation button unit 310 is arranged to simplify the above-mentioned operations. Upon operation of the operation button unit 310, a correction setting operation and a trimming designation operation are omitted, and only the preliminary scanning operation, and telegraphy can be started.

In this manner, the image input operation is completed. The read image signal is processed, and is then output to an external device.

A telegraphy output card board is inserted in the panel 325, and is exchangeable. The card board can be exchanged depending on telegraphic modes (an analog telephone line, a digital telephone line, a modem connection, and the like).

A connector for connecting an external monitor, an external printer, a caption input device, or the like is arranged on the panel 325.

A menu display on the LCD 311 can be selectively made on the basis of a cable connected to the connector of the panel 325 or the type of the inserted card board.

According to the photo-telegraphy apparatus of this embodiment, the following effects can be expected.

Since the stage 306 is horizontally arranged on the front surface side of the apparatus main body 303, a mounting operation of the film holder 307 is easy.

The mounting position (stage 306) of the film holder 307, the operation button units 309 and 310, and the LCD 311 are arranged adjacent to each other, thus improving operability.

Since the illumination unit 301 serves to shield light, no light-shielding lid for removing the influence of external light is required.

A long film can be clamped by the film holder 307 without being cut or wound, and can be mounted on the stage 306.

The film holder 307 does not require a film original winding portion, and can be rendered compact.

Since a zooming function is attained by electrical processing in the trimming function, no zooming optical system is required. In addition, no optical finder is provided. Therefore, a compact, low-cost structure can be realized.

Since the apparatus can be rendered compact, portability can be improved, and a decrease in fatigue of a user can be expected.

As described above, according to the present invention, the optical system, the mechanism section, and the electrical circuit unit are clearly separated from each other, thus allowing easy maintenance.

What is claimed is:

1. An image conversion apparatus for converting an image recorded on an original into an electrical signal upon reception of illumination light transmitted through the original, comprising:

scanning means including a scanning stage for holding the original and a mechanism for moving the scanning stage;

optical means for focusing the illumination light transmitted through the original on a focal plane as an image; and image sensor means for converting the image focused on the focal plane into an electrical signal, wherein said scanning means and said optical means share a single base, and said apparatus further comprises a wall of said base arranged between said mechanism and said optical means, for preventing a lubricant from being scattered from said mechanism to said optical means.

2. An image conversion apparatus according to claim 1, wherein said scanning stage is disposed at the same side of said wall as said optical means.

3. An image telegraphy apparatus for converting an image recorded on an original into an electrical signal upon reception of illumination light transmitted through the original, and for transmitting the electrical signal, comprising:

stage means for holding the original;

moving means for moving said stage means;

an illumination unit having a light source for illuminating the original;

optical means for focusing light transmitted through the original as an image;

line sensor means for converting the focused image into an electrical image signal;

electrical circuit means for processing the image signal from said line sensor means, and outputting the processed image signal; and a main body on which said stage means, said moving means, said illumination unit, said optical means, said line sensor means, and said electrical circuit means are mounted, wherein said illumination unit and said stage means are arranged above a substantially horizontal wall of said main body in an upper portion of said main body on a side of said main body near an operator, said moving means and said optical means are arranged below said horizontal wall of said main body in a lower portion of said main body on the side near the operator, and said electrical circuit means is arranged in a portion of said main body on a side thereof away from the operator.

4. Image conversion apparatus comprising:

a substantially horizontal stage for holding a film medium;

means for projecting light through said film medium;

a stage moving mechanism for moving said stage horizontally;

optoelectrical converting means for optoelectrically converting an image of the film medium;

an imaging optical system for forming an image of the film medium on the optoelectrical converting means; and a single base on which said stage moving mechanism and said imaging optical system are mounted;

wherein said imaging optical system includes a reflector for reflecting light projected through the film medium and an imaging member for forming an image on said optoelectrical converting means from the reflected light, and said stage moving mechanism includes a driving source for supplying a driving force, a transmitting member for transmitting said driving force, and a connecting member for connecting said stage and said transmitting member such that the driving force transmitted by said transmitting member is applied to said stage, said stage moving mechanism being mounted on a first base plate portion of said base and said reflector and said imaging member being mounted on a second base plate portion of said base separated from said first base plate portion.

* * * * *